April 6, 1965 S. A. MINERA 3,176,739
METHOD OF STEMMING FRUIT
Filed June 18, 1962 2 Sheets-Sheet 1
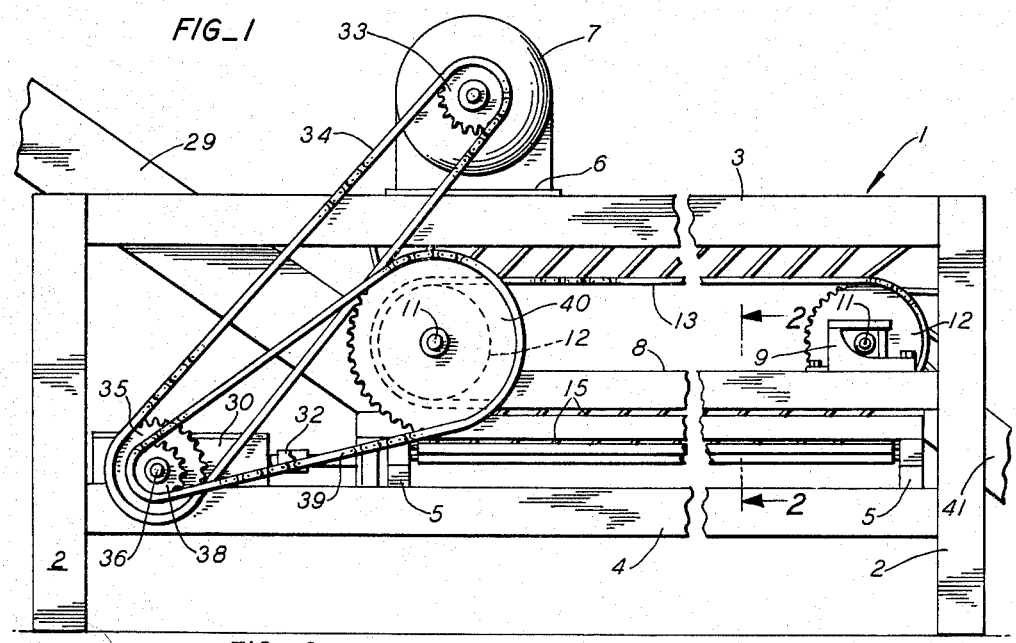
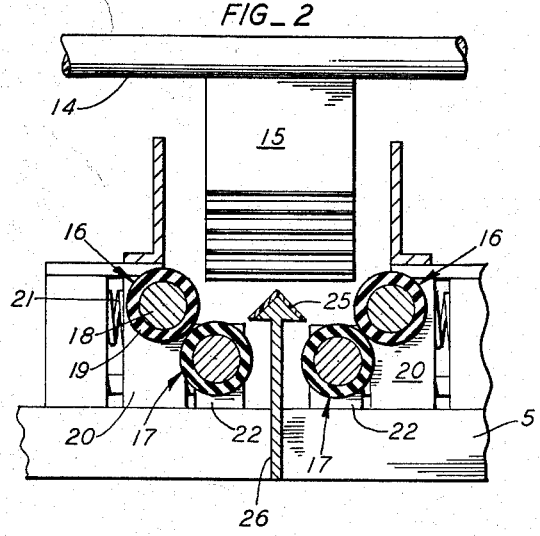
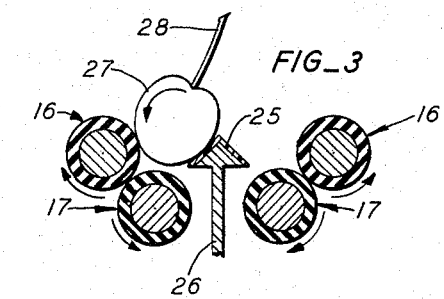
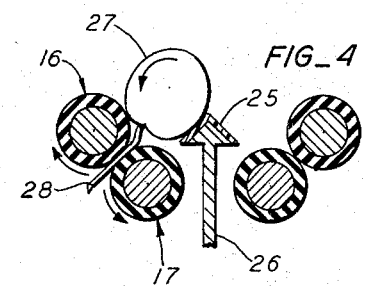
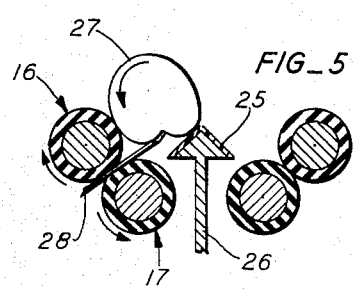
INVENTOR.
SALVADOR A. MINERA
BY
Boykan, Mohler & Foster
ATTORNEYS April 6, 1965 S. A. MINERA 3,176,739
METHOD OF STEMMING FRUIT
Filed June 18, 1962 2 Sheets-Sheet 2
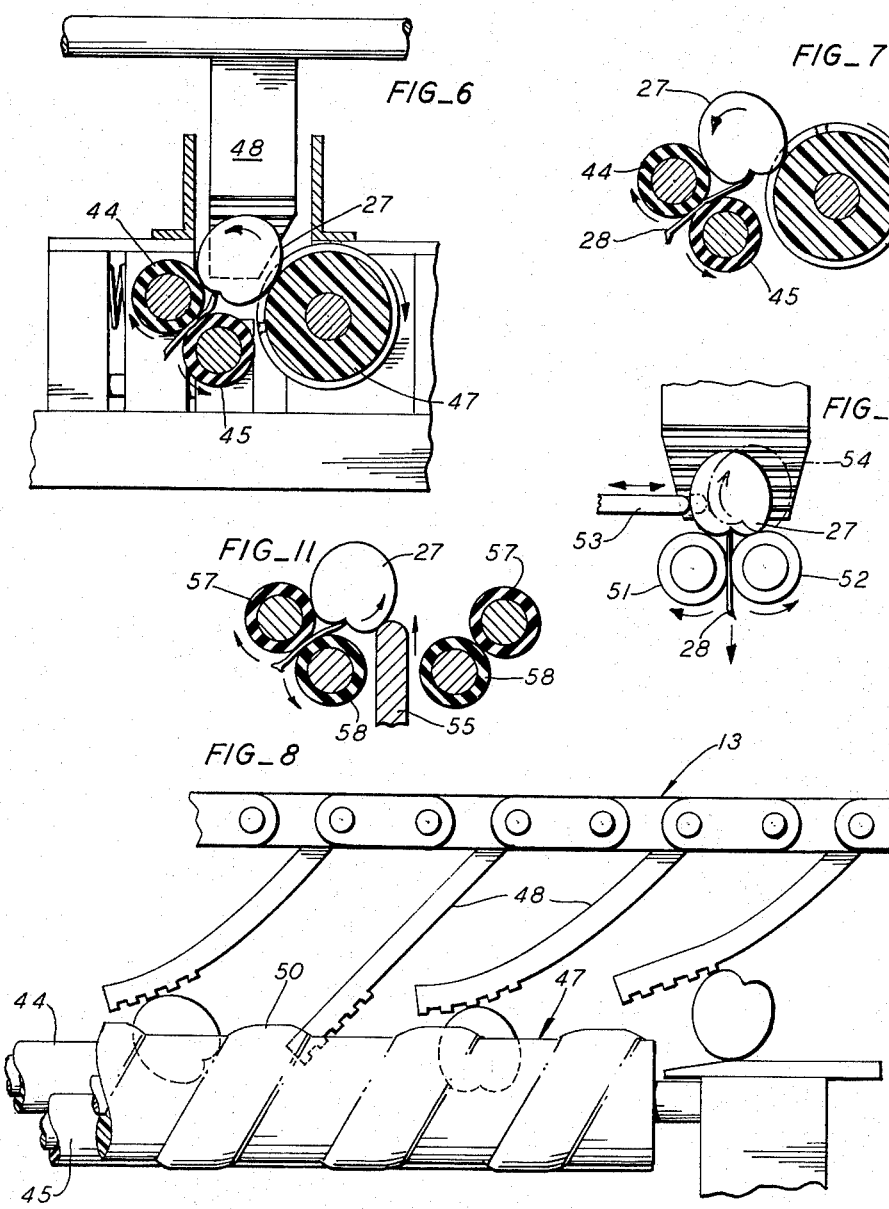
INVENTOR.
SALVADOR A. MINERA
BY
Boyken, Mohler + Foster
ATTORNEYS

United States Patent Office 3,176,739
Patented Apr. 6, 1965

3,176,739
METHOD OF STEMMING FRUIT
Salvador A. Minera, 1500 Judah St., San Francisco, Calif.
Filed June 18, 1962, Ser. No. 203,284
6 Claims. (Cl. 146—238)

This invention relates to a fruit stemmer generally of the type shown in my copending application Serial No. 168,681 filed January 25, 1962, now U.S. Patent No. 3,103,240.

One of the most difficult fruits to consistently stem are cherries. This is due to the wide variance in the tenacity with which the stems are held to the fruit. The actual connection, of course, is with the pit. Cherries grown in different localities and cherries of different varieties have different stem holding characteristics. This may also vary with climatic conditions during development of the cherries.

In referring to cherries, and in the use of the words "cherry" and "cherries" hereafter, it is to be understood that the invention is not to be restricted to use in stemming cherries, since it is equally adapted for stemming grapes, olives, and other fruit having similar stem and body characteristics.

One of the objects of the present invention is a method of stemming in which the stems are quickly separated from the fruit more readily than heretofore, and with less strain.

The stems on some cherries are so tightly connected with the cherries that approximately up to a five-pound pull is necessary to effect a stemming operation, and where the pull required is too great, the stems will be broken.

Also, in a cherry or fruit stemmer of the present general type, the stemming of the cherries may be delayed, and when this occurs, the movement of the cherries in their normal path of travel is blocked.

Where broken stems occur, the cherries must be re-stemmed, which is particularly expensive when the remaining portions of the stems are very short, and also, the more cherries that are unstemmed or defectively stemmed after passing through a stemming machine, results in requiring more inspectors, at substantial expense.

Where stemming of the cherries is delayed, the efficiency of the machine is reduced, and longer stemming rollers may be required to provide a longer period of time for the cherries to remain in an effective stemming zone. This also results in added expense in material and valuable space, and loss in efficiency of the stemmer.

In the present invention a pair of rollers is employed for engaging and pulling the stems from the cherries that are rolled longitudinally of the rollers, and yieldable means, similar to that used in the aforesaid copending application, is used to so roll the cherries. However, in the present invention, when the stems are engaged between the pair of rollers and are pulled by the latter, the cherries are rotated about axes that are paralled with the normal direction of their movement longitudinally of the rollers, or about axes that are substantially parallel with the axes of the stemming rollers. The result is that a pulling force is applied to the stems that is laterally of the blossom-stem axes of the cherries, and the stems become detached from the cherries with a fraction of the force required to separate them when the pull is generally axially of the blossom-stem axes.

One of the objects of the present invention is the provision of a stemmer that is adapted to function in the above manner, i.e., to move the cherry so that the pull on the stem is generally laterally of the blossom-stem axis of the cherry, to thereby detach the stem from the cherry with relatively small force compared with the force necessary when the pull is substantially axially of the blossom-stem axis.

Another object of the invention is the provision of an improved method of stemming fruit bodies, such as cherries, grapes, olives and the like, to more efficiently detach the stems from such fruit than by previous apparatus or by prior methods.

Other objects and advantages will appear in the description and in the claims.

In the drawings, FIG. 1 is a side elevational view of a stemmer that embodies the present invention, said view being broken in length.

FIG. 2 is an enlarged fragmentary cross sectional view taken along line 2—2 of FIG. 1.

FIG. 3 is a fragmentary cross sectional view similar to that of FIG. 2 but showing a fruit body in a position in the stemmer before its stem is engaged by one of the two sets of rollers seen in FIG. 1.

FIG. 4 is a view similar to that of FIG. 3 after the stem is engaged between a pair of rollers.

FIG. 5 is a view similar to that of FIG. 4 with the stem and cherry at the point where the stem will separate from the friut body and pit.

FIG. 6 is a modification of the structure shown in FIG. 2 with a cherry in a position prior to stemming, but with the stem engaged between the stemming rollers.

FIG. 7 is a view similar to that of FIG. 6 in which the stem has just separated from the cherry that is being stemmed.

FIG. 8 is a fragmentary, side elevational view of a part of the stemmer of the type shown in FIG. 6.

FIG. 9 is a further modification of the structure shown in FIGS. 2 and 6.

FIG. 10 is a reduced size fragmentary side elevational view illustrative of an additional modification of the structure of FIGS. 2 and 9.

FIG. 11 is an enlarged fragmentary sectional view taken along line 11—11 of FIG. 10.

In detail the machine of the present invention comprises a frame, generally designated 1, having supporting legs 2 between which upper and lower horizontal side frame members 3, 4 extend, while cross frame members 5 extend transversely across the frame between corresponding ends of the lower side frame members 4.

An upper cross frame member 6 supports a motor 7 thereon, and frame members 8, disposed intermediate the upper and lower side frame members 3, 4, and parallel therewith, support bearings 9 adjacent opposite ends thereof that, in turn, support shafts 11 for rotation thereof.

The right hand shaft 11, as seen in FIG. 1, has a pair of spaced sprocket wheels 12 secured thereon, and a similar pair of sprocket wheels 12 is secured on the left hand shaft 11, as viewed in FIG. 1. A pair of sprocket chains 13 extend around and connect sprocket wheels 12.

Links of chains 13 support bars 14 (FIG. 2) that extend between the pair of chains, at substantially uniform distances, which bars carry flat sided, resilient, flexible members 15 of rubber or of rubber-like material secured thereto. These members 15 are inclined (FIG. 1) in a direction rearwardly and downwardly from their connections with bars 14, relative to the direction of movement of the lower flights of said chains. Thus the lower portions of members 15 along the lower flights of chains 13 trail the upper portions of said members. These members 15 have sufficient rigidity to be substantially self-sustaining in said inclined positions, so as to roll the fruit adapted to be engaged by their downwardly facing surfaces of said members and to yieldably roll over said fruit. The structure of these members 15 is similar to that shown in greater detail in my U.S. Letters Patent No.

2,819,745 of January 14, 1958, and all of the structure hereinabove described is similar to that shown in my co-pending application Serial No. 168,681, filed January 25, 1962.

A plurality of said members 15 may be on each bar 14, which members are aligned to provide parallel rows thereof extending longitudinally of the chains. The number of such rows would depend upon the desired capacity of the stemmer. One row in a machine would be an example of a machine having a minimum capacity.

As seen in FIGS. 2 to 5, several sets of stemming rollers are shown below the member 15 of one row of the latter, each set of rollers comprising two horizontally spaced pairs of horizontally extending rollers, with the pairs thereof disposed in planes extending divergently upwardly from a vertical plane that bisects the space between the two pairs of each set of rollers. This arrangement provides an elongated, generally V-shaped trough (FIG. 2), each side of which comprises one pair of the four rollers of each set. It is in one end of this trough that the unstemmed fruit bodies, such as cherries, are fed.

The upper rollers of each set are designated 16 while the lowers are designated 17. These rollers may be steel shafts 18 covered with relatively soft rubber 19, and the rollers of each pair are in yieldable frictional engagement with each other, while the two pairs of rollers of each set are spaced apart. That means that the lower rollers 17 of each set are spaced apart, and the upper rollers of each set are spaced apart a much greater distance. The bearings 20 that mount the upper rollers are spring urged by springs 21 toward the fixed bearings 22 of the lower set, hence the rollers in each pair may yieldably move apart to permit any solids to pass between them that are too large for the yieldability of the resilient rubber or rubberlike outer layers 19 of the rollers. In my before mentioned U.S. Patent No. 2,819,745 and in my said co-pending application Serial No. 168,681 is shown structure adapted to support the rollers 16, 17.

The fundamental differences between the method of the present invention and the method shown in said copending application commences at this point in this description.

Heretofore the cherries have been supported against the surfaces of both rollers of each pair of stemming rollers. The adjacent engaging surfaces of each pair of stemming rollers have been rotated in the same direction away from the cherries. The pair of stemming rollers against which the cherries have heretofore been drawn by pulling on the stems exactly centers the cherries in a plane centrally between the pair of rollers, so that the pull on the stems will be radially outwardly from the center of each cherry. The means for moving the cherries along their path of travel has not materially effected the direction of pull on the stems.

In the present invention, as illustrated in FIGS. 1–5 an inverted V-shaped strip 25 is positioned centrally over the space between the pairs of rollers of each set, and this strip extends from end to end of the rollers. A vertical support 26 between the lower rollers supports the strip 25 at a sufficient elevation to support a cherry 27 on either of the convergently upwardly extending surfaces thereof and against the upper roller 16 at one or the other sides of the strip 26 (FIG. 3). Said upper surfaces of the strip have a hard layer of antifriction material thereon, such as the plastic material known under the trade name of Teflon to provide a slick surface in engagement with the cherries.

The relatively soft rubber or rubber-like outer surfaces of the rollers are not as slippery as the Teflon upper surfaces of the strip 25, and will yieldably engage the stems 28 of the cherries between rollers 16, 17.

In operation the cherries will be fed into each channel defined by the pairs of rollers 16, 17, at the left end of the machine, as viewed in FIG. 1. A chute 29 may be used for this purpose. The pair of rollers 16, 17 at each side of each strip 25 are rotated oppositely in each pair with their engaging sides moving in a direction away from the strip 25, such rotation being through gears in a gear box 30, providing a gear drive, and which drive is connected by universal joints 32 with the shafts 18 of the rollers 16, 17.

The gears in the gear box are driven by motor 7, the latter of which may include a sprocket wheel 33 connected by a chain 34 with a sprocket wheel 35 that, in turn, is on a shaft 36 that drives the gears, and consequently rollers 16, 17.

Also on shaft 36 is a sprocket wheel 38 that is connected by a chain 39 with sprocket wheel 40 on shaft 11. Thus shaft 11 carries the sprocket wheels 12 over which the chains 13, that carry members 15, extend. Thus motor 7 moves the members 15 from the left hand end of the stemming machine, longitudinally of the rollers toward the right hand end of the machine, and toward discharge chute 41.

During this movement of members 15, the cherries are rolled on the surfaces of the strip 25 and on the upper rollers 17, and the stems are caught between the pair of rollers 16, 17 at one side or the other of the strip 25.

It should be noted at this point that the members 15 roll the cherries longitudinally of the rollers and exert a slight force against said cherries after the stems are caught between the rollers 16, 17, but this is not sufficient to pull the stems from the most tenaciously held stems, nor to rotate the cherries so their stems extend laterally relative to their blossom-stem axes. Instead the stems on such cherries will pull from between the rollers, and will be inclined generally in the direction of travel of the rollers so that the force of the pull on the stems is substantially radially of the cherries and axially of the blossom stem axes.

In the present instance, however, almost as soon as the stems 28 are caught between the rollers, as seen in FIG. 4, the upper roller will, with progressively increasing force, as the stem is pulled between the rollers, roll the cherry so that the pull on stem of each cherry is no longer radially of the cherry, but is laterally, relative to the blossom-stem axis, as seen in FIG. 5, and the stem is quickly detached from the cherry pit as soon as this occurs. The direction of rotation of the cherry, in order to accomplish this result, is about an axis that is substantially parallel with the axis of rotation of the rollers 16, 17, instead of being at right angles to the axis of rotation of the rollers and to the path of travel of the cherries.

In cherry stemming machines, as in many of the fruit handling machinery in canneries, the equipment is wet, which adds to the antifriction characteristics of much of the equipment. In the present instance the antifriction upper surfaces of the strip 25 offers very little resistance to rotation of the cherries that are supported thereon, however, as an alternative, the modification shown in FIG. 6 may be used.

In FIG. 6 one pair of the rollers 44, 45 is employed, and these are the same as one pair of the rollers 16, 17 in FIG. 2. Instead of the strip 25, however, a larger diameter, rubber roller 47 is positioned alongside the rollers 44, 45, which roller is spaced from the lower roller 45 of said pair a sufficient distance to support the cherries 27 against the upper roller 44 but which cherries are free from engagement with the lower roller 45.

The upper roller 47 is preferably positively rotated in a direction, so that its surface that faces rollers 44, 45 will move upwardly, whereas the direction of rotation of the roller 44 of pair 44, 45 thereof is downwardly. The gearing in a gear box is similar to gear box 30, and effects the desired rotation of rollers 44, 45 and 47. Rollers 44, 45 are rotated the same as the rollers 17, 16 shown at the left side of the set shown in FIG. 2.

Members 48, substantially corresponding to members 15 of FIG. 2 function to move the cherries longitudinally of the rollers.

In this arrangement, it is seen that while the capacity of the stemmer may be reduced, the rotation of the cherries about an axis substantially parallel with that of the rollers is more positive, in that the roller 47 rotates.

To more efficiently accommodate cherries of different sizes, the roller 47 may have a relatively wide, flat, spiral rib 50 (FIG. 8) on its outer periphery, so that the larger cherries in the grooves between the ribs or lands, will be supported at approximately the same distance as the smaller cherries from the rollers 44, 45. Thus at some point along the rollers the shorter stems will be caught between the rollers. Also, the direction of rotation of the roller 47 is such that the movement of the cherries longitudinally of the roller will be facilitated by the presence of the grooves and lands, rather than obstructed thereby.

FIG. 7 is illustrative of the lateral pull that is exerted on the stem 28 of the cherry 27.

FIG. 9 and FIGS. 10, 11 illustrate a further modification of the invention in which the cherries are each intermittently rotated about an axis that is parallel to that of the stemming rollers, and to positions spaced from one roller of the pair of stemming rollers.

In FIG. 9 a pair of stemming rollers 51, 52 are shown and these are, like rollers 16, 17, rotated oppositely to grip the stem 28 of cherry 27 therebetween for pulling the stem from the body.

However, in the event the stem is not instantly pulled from the cherry, a laterally reciprocably movable member 53 will roll the cherry 27 to one side toward dot-dash position 54 to effect a result such as shown in FIGS. 5 and 7 in which the stem is pulled laterally of the blossom-stem axis of the cherry.

In FIG. 10 a vertically reciprocable member 55 supported between guides 56 for vertical reciprocation is positioned between two pairs of rollers corresponding to rollers 16, 17 of FIG. 2 (FIG. 11), the upper rollers being designated 57 and the lower rollers 58. The upper surface of member 57, which extends longitudinally of the rollers, may have a Teflon coat to be quite slippery where it engages the cherries.

Cams 59 on shafts that are rotatably supported on bearings carried by the frame of the machine may support the cams for rotation and the latter support the member 55, while springs 60 yieldably hold the member 55 against the cams.

The cam shafts 61 carry either sprocket wheels or pulleys that, in turn, may be connected by either sprocket chains 62 or V-belts or the like, with wheels or pulleys on a common shaft 63. The shaft 63 carries a sprocket wheel or pulley that, in turn, extends to any suitable sprocket wheel or pulley on a shaft extending from a gear in a gear box, such as 30 in FIG. 1, for driving by a motor, such as motor 7.

Cherries 27 (FIG. 11) are fed between the two pairs of rollers, as in FIG. 2, and members such as members 15 (FIG. 2) will roll the cherries longitudinally of the rollers.

Whether or not the cherries actually simultaneously engage the rollers 56, 58 at one or the other sides of the member 55 at any time is not particularly important. In any event the cherries will be rolled about axes parallel with the axes of the rollers, and clear of the lower rollers, when member 55 is moved upwardly, and the stems will be pulled laterally of the blossom-stem axes of the cherries when said cherries are moved upwardly by members 55.

In all of the forms of the invention, there is the common feature of moving the cherries so that the direction of the pull on the stems will be laterally of the blossom-stem axes of the cherries, and in all forms of the invention the cherries are rotated about axes that are parallel with the direction of movement of the cherries in their path of travel, or parallel with the axes of the stemming roller.

In both FIGS. 9 and 11 it is desirable that the members 53 and 55 which extend longitudinally of the rollers be flexible so as to bend or flex laterally, so that quite small cherries would not be crushed between the members 53 or 55 and the roller toward which the cherry is urged. Thus the members 53 and 55 would flex away from the last mentioned roller. In the case of extra large cherries, the same flexing would occur, which would assure yieldably moving the large cherry against the roller that is to rotate it. Obviously even were the cherry to not completely clear one of the rollers, the reduction in the frictional resistance between the cherry and the other roller would normally result in the desired rotation of the cherry. The members 53 and 55 are preferably relatively soft and resilient, so that the pressure against the cherry will form an indent in the rubber without crushing the cherry, thus preventing injury to the cherries under normal conditions. Sponge rubber having sufficient body to urge the cherries against one of the rollers, as illustrated, with sufficient force to provide the desired friction and yet sufficiently soft to prevent crushing the cherry has been found to be suitable.

It is to be understood that the claims appended hereto are intended to cover such modifications as come within the scope of the wording thereof and of the spirit of the invention.

I claim:

1. The method of stemming cherries and the like that comprises the steps of:
   (a) moving cherries in a straight path of travel longitudinally thereof in one direction,
   (b) engaging the stems of said cherries during said movement in said path in said one direction,
   (c) gripping the stems of said cherries at one side of said path during their said movement in said one direction, then
   (d) holding said stems in positions projecting to said one side of said path when so gripped against movement thereof in said one direction in said path and
   (e) rotating the cherries on the stems so held relative to said stems about axes extending generally parallel with said path and transversely of the blossom-stem axes of said cherries whereby the stems will be pulled from said cherries in a direction substantially transversely of the blossom-stem axes of said cherries.

2. The method of stemming cherries as defined in claim 1, that includes the step of:
   (f) applying a force against said cherries tending to roll them longitudinally of said path in said one direction when said stems are so held and gripped, whereby said cherries will be rolled in said one direction in said path upon separation of the stems therefrom,
   (g) constantly and positively pulling said stems axially thereof in a direction transversely of and in a direction outwardly of said path immediately after said stems are so gripped and positively moving said stems outwardly of and away from said path immediately upon separation of said stems from said cherries.

3. The method of stemming a fruit body such as a cherry, grape, olive and the like having a stem attached thereto at a point at one side thereof and projecting outwardly of said body from its point of attachment thereto, comprising the steps of:
   (a) rolling said body in one direction in a predetermined path of travel about an axis extending through said body transversely of said path;
   (b) gripping said stem at a point along one side of said path closely adjacent thereto;
   (c) holding said body substantially at said point by said stem against further rolling of said body in said one direction about said axis, and substantially at the same time;
   (d) pulling said stem axially thereof outwardly of said body and path in a direction substantially at a right angle to said path and then
   (e) rotating said body relative to said stem about an axis extending through said stem and substantially parallel with said path while continuing to so pull said stem to thereby separate said stem from said body at said point of attachment.

4. The method of stemming a cherry and the like that comprises the steps of:
   (a) pulling said cherry by its stem against a rotating surface at one side of said stem;
   (b) then and while so pulling said cherry by said stem against said surface rotating said cherry on said surface relative to said stem about an axis substantially parallel with the axis about which said surface rotates and in a direction opposite to the direction of movement of said surface whereby said cherry will be separated from said stem.

5. The method of stemming unstemmed cherries and the like that comprises the steps of
   (a) rolling said cherries along a horizontally extending path of travel in one direction longitudinally of the latter with their stems projecting in an indiscriminate number of directions relative to said path and at the same time rotating said cherries about axes that generally extend longitudinally of said path until the stems thereon project to one lateral side or the other of said path;
   (b) gripping the stems at the lateral side of said path to which said stems project upon said stems so projecting;
   (c) then pulling the stems so gripped laterally relative to said path to the same side thereof as the stem projects and at substantially the same time,
   (d) stopping the rolling of the cherries having their stems so gripped, in a direction longitudinally of said path and immediately thereafter;
   (e) positively rotating the cherries so stopped about axes extending generally longitudinally of said path until said cherries have been separated from their stems; then
   (f) continuing the rolling of said cherries longitudinally of said path and ejecting the removed stem laterally from said path.

6. The method of stemming a cherry and the like that comprises the steps of:
   (a) gripping the stem of said cherry, and then
   (b) pulling the side of said cherry that is at one side of the juncture between said cherry and stem against a first surface and then
   (c) engaging the side of said cherry that is generally opposite to said first surface by a second surface;
   (d) then positively moving said first surface and said second surface in the same circular paths about parallel axes with said first surface moving generally toward said juncture from its point of engagement with said one side; and then
   (e) continuing to pull said cherry by its stem in a direction radially outwardly of said cherry against said first surface, whereby said cherry will be positively rotated relative to said stem about an axis that is parallel with said axes to separate said cherry from said stem.

References Cited by the Examiner
UNITED STATES PATENTS

| | | | |
|---|---|---|---|
| 1,890,676 | 12/32 | Fox | 146—81 X |
| 1,924,111 | 8/33 | Erickson | 146—222 |
| 2,508,728 | 5/50 | Stansbury | 146—228 |
| 2,738,816 | 3/56 | Lightfoot | 146—55 |
| 2,742,068 | 4/56 | Metcalf | 146—55 |
| 3,036,613 | 5/62 | Minera | 146—55 |

J. SPENCER OVERHOLSER, *Primary Examiner.*
CARL W. ROBINSON, *Examiner.*